United States Patent [19]
Diepstraten et al.

[11] Patent Number: 5,422,887
[45] Date of Patent: Jun. 6, 1995

[54] MEDIUM ACCESS PROTOCOL FOR WIRELESS LOCAL AREA NETWORK

[75] Inventors: Wilhelmus J. M. Diepstraten, VL Diessen; Hendrik van Bokhorst, MB Nijkerk, both of Netherlands

[73] Assignee: NCR Corporation, Dayton, Ohio

[21] Appl. No.: 257,233

[22] Filed: Jun. 9, 1994

Related U.S. Application Data

[63] Continuation of Ser. No. 799,576, Nov. 27, 1991, abandoned.

[51] Int. Cl.$^6$ .................................... H04J 3/24
[52] U.S. Cl. ........................................... 370/85.3
[58] Field of Search ............ 370/85.1, 85.2, 86.7, 370/94.1, 95.1, 95.2, 100.1, 60, 85.3, 105.1, 105, 105.2, 105.4, 105.5; 375/107, 109, 114, 116

[56] References Cited

U.S. PATENT DOCUMENTS

| | | | |
|---|---|---|---|
| 4,411,007 | 10/1983 | Rodman et al. | 375/109 |
| 4,860,006 | 8/1989 | Barall | 370/85.2 |
| 4,979,168 | 12/1990 | Courtois et al. | 370/94.1 |
| 5,040,175 | 8/1991 | Tuch et al. | 370/94.1 |
| 5,068,916 | 11/1991 | Harrison et al. | 370/100.1 |
| 5,128,960 | 7/1992 | Driest et al. | 375/107 |
| 5,159,592 | 10/1992 | Perkins | 370/85.7 |
| 5,164,942 | 11/1992 | Kamerman et al. | 370/94.1 |

*Primary Examiner*—Douglas W. Olms
*Assistant Examiner*—Dang Ton
*Attorney, Agent, or Firm*—Paul J. Maginot

[57] ABSTRACT

A station which broadcasts a frame of information over a wireless local area network, waits a predetermined time calculated to allow other stations to gain access to the network, and thereafter broadcasts another frame of information. A method is provided which improves access fairness while reducing the collision probability, thereby increasing data throughput in the network.

15 Claims, 7 Drawing Sheets

MEDIUM ACCESS PROTOCOL FOR WIRELESS LOCAL AREA NETWORK

This is a continuation of application Ser. No. 07/799,576, filed on Nov. 27, 1991, now abandoned.

CROSS REFERENCE TO RELATED APPLICATIONS

The present invention relates to a wireless local area network (LAN). More particularly, it relates to a protocol for transferring data within a wireless LAN.

"Local Area Network Having A Wireless Transmission Line" U.S. application Ser. No. 633,691, filed Dec. 24, 1990, invented by Ad Kamerman and H. Van Bokhorst.

BACKGROUND OF THE INVENTION

A local area network (LAN) is a grouping of individual stations or personal computers in a relatively small area such as an office building. The stations are interconnected or linked to facilitate the transfer of data and the sharing of peripherals. A conventional LAN is "hardwired", i.e., the stations are linked by high performance cables. A recent improvement in LANs is the development of a wireless LAN in which stations are linked by radio signals. The wireless LAN is cheaper to install than a conventional wired LAN and is more flexible in the movement and placement of stations.

In general, a specific protocol must be followed in order for a station to gain access to the medium (network). In a particular class of wired LANs, referred to as Ethernet, a random access protocol is employed.

An issue common to both conventional and wireless LANs is collision avoidance. A collision occurs when more than one station transmits at the same time. One widely used method of collision avoidance for conventional LANs is known as CSMA/CD (carrier sense multiple access with collision detection). According to this known method, a station wishing to transmit a message listens until the link or transmission channel is idle before commencing to transmit an information packet. The station continues to listen to the channel during its transmission, and if a collision is detected, terminates its transmission and transmits a jam pattern to notify other stations of the collision.

Data is transferred in frames which are separated by a fixed minimum time referred to as the interframe spacing (IFS). According to the typical CSMA/CD protocol, each station is free to attempt to broadcast a data frame at the end of the IFS period. A collision results when two stations start to transfer data at the same time or within the time needed to detect a carrier signal on the medium. When a collision is detected the stations are pushed into a random backoff period. The random backoff period prevents further attempts to transmit data until after the period expires. As the backoff period is random, the chances of two stations again attempting to access the network at the same time is reduced. The transfer of data, including the backoff algorithm, is handled by a so-called Medium Access Controller chip (MAC) on each station.

The CSMA/CD protocol is the subject of an international (ISO) standard and corresponding IEEE Standard Number 802.3, and is a generally used random access protocol for wired LANs. Consequently, CSMA/CD controller chips are widely available. For example, the Intel 82586 LAN coprocessor chip available from Intel Corporation of Santa Clara, Calif.

Collision detection on a wireless LAN is difficult to implement because a transmitting station cannot generally receive a much lower level signal on the medium while it is transmitting a much higher level signal. U.S. patent application Ser. No. 633,691, Kamerman et al., now U.S. Pat. No. 5,369,639, referred to above, describes a novel station which is adapted to use a standard CSMA/CD controller chip in a wireless LAN environment. In Kamerman et al. each station that wants to transmit immediately after the IFS period is pushed into the random backoff period at the end of the IFS period, even though there has been no collision. This greatly reduces the number of collisions which occur.

An issue not addressed by Kamerman et al. is that of equitable access to the network by the various stations on the LAN. For example, the random backoff period is only applied to those stations not presently broadcasting data. In other words, the broadcasting station need only wait until the end of the IFS period before broadcasting another data frame. For certain network operating systems, such as Novell's Netware v 2.15, client workstations which transmit a data frame must wait until receiving an acknowledgment before transmitting a second frame. Thus, no client workstation can unfairly dominate the network. However, a server frequently has a number of data frames ready for transmission. Therefore, the server is likely to tie up the network for multiple data frame transfers. This reduces data throughput and the efficiency of the system.

OBJECTS OF THE INVENTION

It is therefore an object of the present invention to provide a new and improved station for a wireless LAN.

It is another object of the present invention to provide a new and improved method for transferring data in a wireless LAN.

It is a further object of the present invention to provide a protocol which increases data throughput in a wireless LAN.

It is yet another object of the present invention to provide a protocol which improves the efficiency of a wireless LAN.

It is yet a further object of the present invention to provide a wireless LAN which equitably controls access by server and client workstations.

SUMMARY OF THE INVENTION

One form of the present invention is a station which broadcasts a first frame of information over a wireless local area network, waits a predetermined time calculated to allow other stations to gain access to the network, and thereafter broadcasts a second frame of information.

Another form of the present invention is a method of improving data throughput performance in a wireless network having a server and a plurality of workstations. A first of a series of data frames is transmitted from the server. Each attempt to transmit a data frame from a workstation is delayed for a random time after completion of the transmission. The transmission attempt of the second of the series of data frames from the server is then delayed for a time greater than the random time.

DESCRIPTION OF A PREFERRED EMBODIMENT

Lan 10

Figure 1:
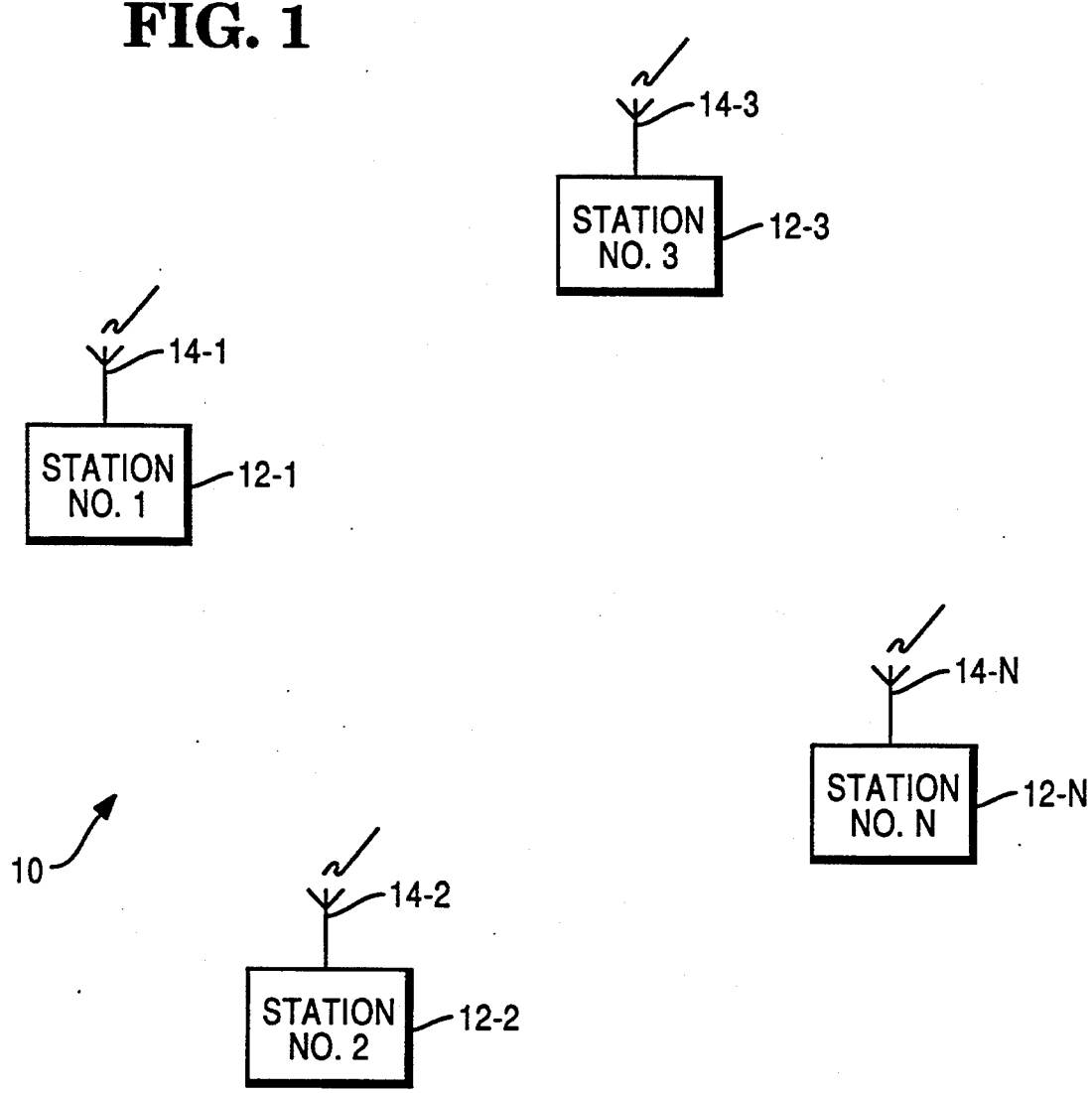
FIG. 1 is a diagram of a wireless LAN.

FIG. 1 shows a wireless local area network (LAN) 10 including a plurality N of stations 12, shown individually as 12-1 to 12-N. Each station has an antenna 14, shown individually as 14-1 to 14-N. Although only a single antenna is shown for each station, it will be understood that each station may have two antennas to provide a diversity feature for alleviating multipath fading which may arise in most environments. In a preferred embodiment, station 12-1 is a server (referred to herein as server S) and stations 12-2 to 12-N are client workstations. However, more than a single server can be designated in the network.

Communication among the stations 12 takes place over a wireless link, on a single wireless channel. The communication preferably uses spread spectrum communication technology, but is not limited thereto.

Station 12

Figure 2:
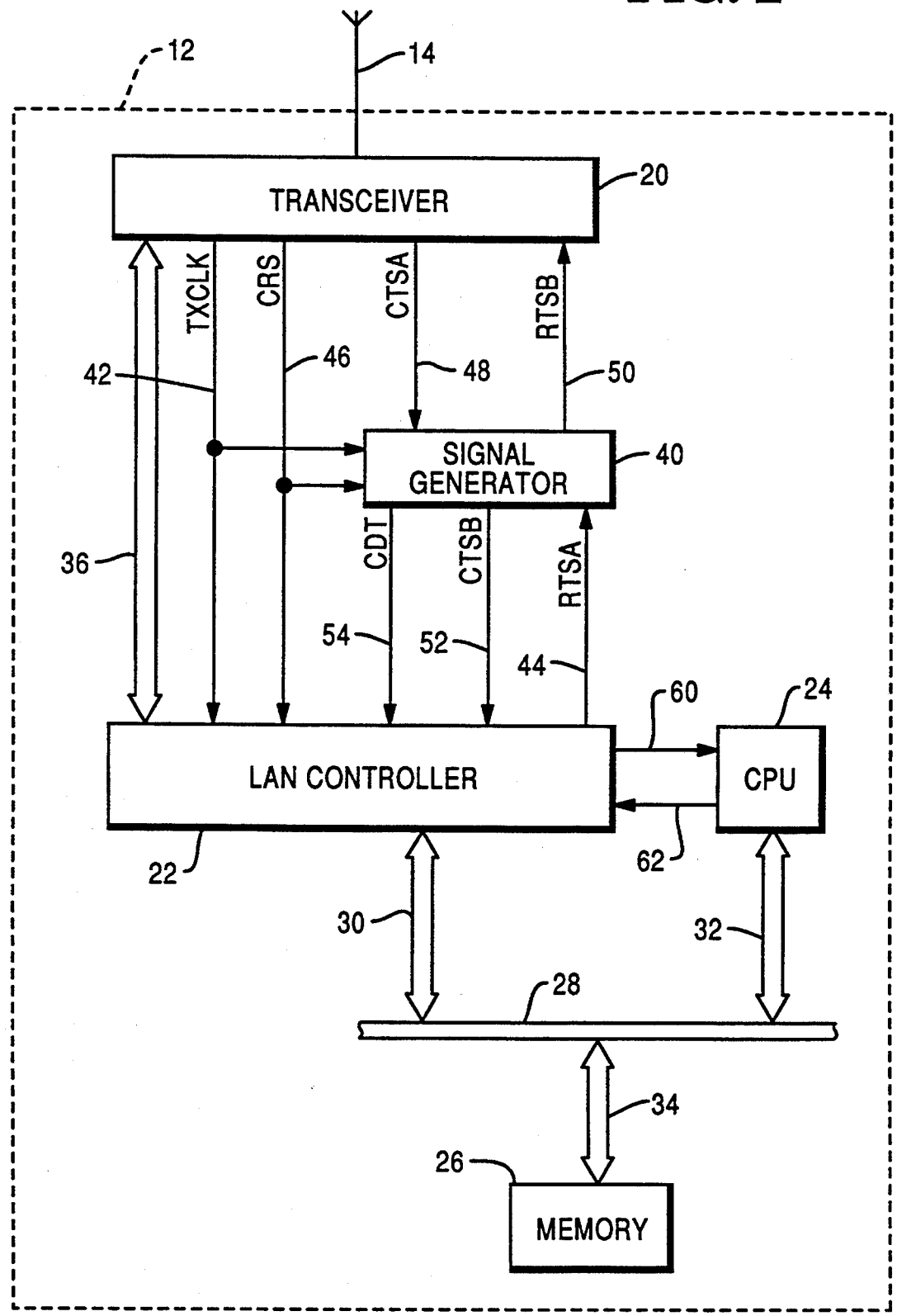
FIG. 2 is block diagram of a typical station utilized in the LAN shown in FIG. 1.

FIG. 2 shows a block diagram of the components of a typical station 12. The station 12 includes a transceiver 20, a LAN controller 22, a central processor unit (CPU) 24, and a memory 26. A local bus 28 is connected to the LAN controller 22 by a bus 30, to the CPU 24 by a bus 32, and to the memory 26 by a bus 34. The LAN controller 22 is a commercially available LAN controller device, suitable for the CSMA/CD (carrier sense multiple access with collision detection) protocol. In the preferred embodiment, the LAN controller 22 is an Intel 82586 LAN coprocessor chip, available from Intel Corporation of Santa Clara, Calif., U.S.A.

The transceiver 20 and LAN controller 22 are interconnected by a bus 36 which carries data and control signals. Also included in the station 12 is a signal generator circuit 40 which is interposed between the transceiver 20 and the LAN controller 22. The signal generator circuit 40 receives transmit clock pulses TXCLK from the transceiver 20 over line 42 and a request-to-send signal RTSA from the LAN controller 22 over a line 44.

The signal generator circuit 40 also receives a carrier sense signal CRS and a clear-to-send signal CTSA from the transceiver 20 over lines 46, 48 respectively. The TXCLK pulses on the line 42 and the CRS signal on the line 46 are also applied directly to the LAN controller 22.

The signal generator circuit 40 provides an output request-to-send signal RTSB over a line 50 connected to the transceiver 20, an output clear-to-send signal CTSB over a line 52 connected to the LAN controller 22, and an output simulated collision detect signal CDT over a line 54 also connected to the LAN controller 22. The functions of the various signals applied to, and provided by, the signal generator circuit 40 will be explained in detail hereinafter.

The LAN controller 22 is connected to the CPU 24 over signal lines 60 and 62, whereby control signals (such as interrupts) may be passed between the CPU 24 and the LAN controller 22.

Operation of LAN Controller 22

It should be understood that the LAN controller 22 operates according to the CSMA/CD protocol, as set forth for example in the IEEE 802.3 standard. As previously mentioned, the LAN controller 22 is a commercially available LAN controller device. The operation of such a controller in accordance with usage in a CSMA/CD system will now be briefly described by way of background information. Thus, where used in a wired LAN utilizing the CSMA/CD protocol, the controller constantly monitors link activity. Whenever it senses a carrier signal on the link, the controller will not pass a data frame by deferring any pending transmission. After the carrier signal goes inactive, the controller continues to defer for an interframe spacing time configurable to a certain number of clock cycles. If, at the end of that time, it has a frame waiting to be transmitted, transmission is initiated independently of the sensed carrier. After transmission has been started, the controller attempts to transmit the entire frame. In the normal case, frame transmission is completed, and the host processor is notified. However, transmission may be terminated prematurely. This occurs, for example, when the collision detect input to the controller is activated, as will now be described.

When the controller has finished deferring and has started transmission, it is still possible to experience link contention. This situation is called a collision, and it is generally detected by the transceiver, which then activates the collision detect input to the controller. The controller informs the other stations of a collision by transmitting a jam pattern, which is detected by the other stations in the LAN.

The dynamics of collision handling are largely determined by a so-called "slot time". The slot time is configurable and normally based on the maximum end to end round trip delay time of the network plus jam time. The slot time is also an integral number of clock cycles. Slot time is important because it is the worst case time to detect a collision. After a collision, the controller attempts to retransmit the frame after a so-called backoff time, unless the number of retransmission attempts has exceeded the maximum allowed. The controller calculates the backoff time according to the IEEE 802.3 standard: backoff is an integral number of slot times. It is a random number, from 0 to a maximum value. The maximum value is $2^R-1$, where R is the minimum between 10 and the number of retransmission attempts. This range can be given an offset using an "accelerated contention resolution" mechanism. The application of this capability gives a range from 0 to a maximum value of $2^{R+K}-1$, where K is the retry counter offset and R+K has a maximum value of 10. It should be understood that the controller includes a retry counter which is incremented after each retransmission attempt. If retransmission is successful, the user is notified. If the number of retries exceeds the maximum, an error is reported.

Returning to the single-channel wireless LAN 10, FIG. 1, difficulties arise in an attempt to apply a CSMA/CD protocol since a station 12 which is transmitting cannot receive a much lower level signal, thereby rendering the detection of a collision difficult or impossible. However, it would be feasible to apply a CSMA technique without collision detection if the risk of collisions were small. This requires that any carrier activity has to be detected very quickly to minimize the probability that different stations start transmitting simultaneously or at times very closely spaced. The carrier detect time can be regarded as a period during which collisions can occur, and it should be small compared to the message duration. In a wireless LAN, the carrier detect time has several contributions, namely transceiver delay (transmitter and receiver) and through-the-air delay. The main part of the carrier detect time (of about 23 microseconds) is contributed by the receiver, resulting from functions such as automatic gain control, correlator filter, and carrier-signal detection. The through-the-air delay at indoor distances below 300 meters is small (less than 1 microsecond). This carrier detect time is relatively long compared with a typical carrier detect of about 1 to 6 microseconds for a wired LAN. Thus, the application of a straightforward CSMA technique for a wireless LAN has disadvantages.

Signal Generator Circuit 40

The signal generator circuit 40 (FIG. 2) is effective to simulate a collision, thereby providing a CDT (collision detect) signal on the line 54 when a data frame transmission has been deferred, even though no actual collision has occurred. Thus, transmission or broadcast of the deferred data frame is initiated only after the lapse of a random backoff time. In this manner, the risk of collisions resulting from stations 12 commencing to transmit at simultaneous or closely spaced times is considerably reduced.

Figure 3A:
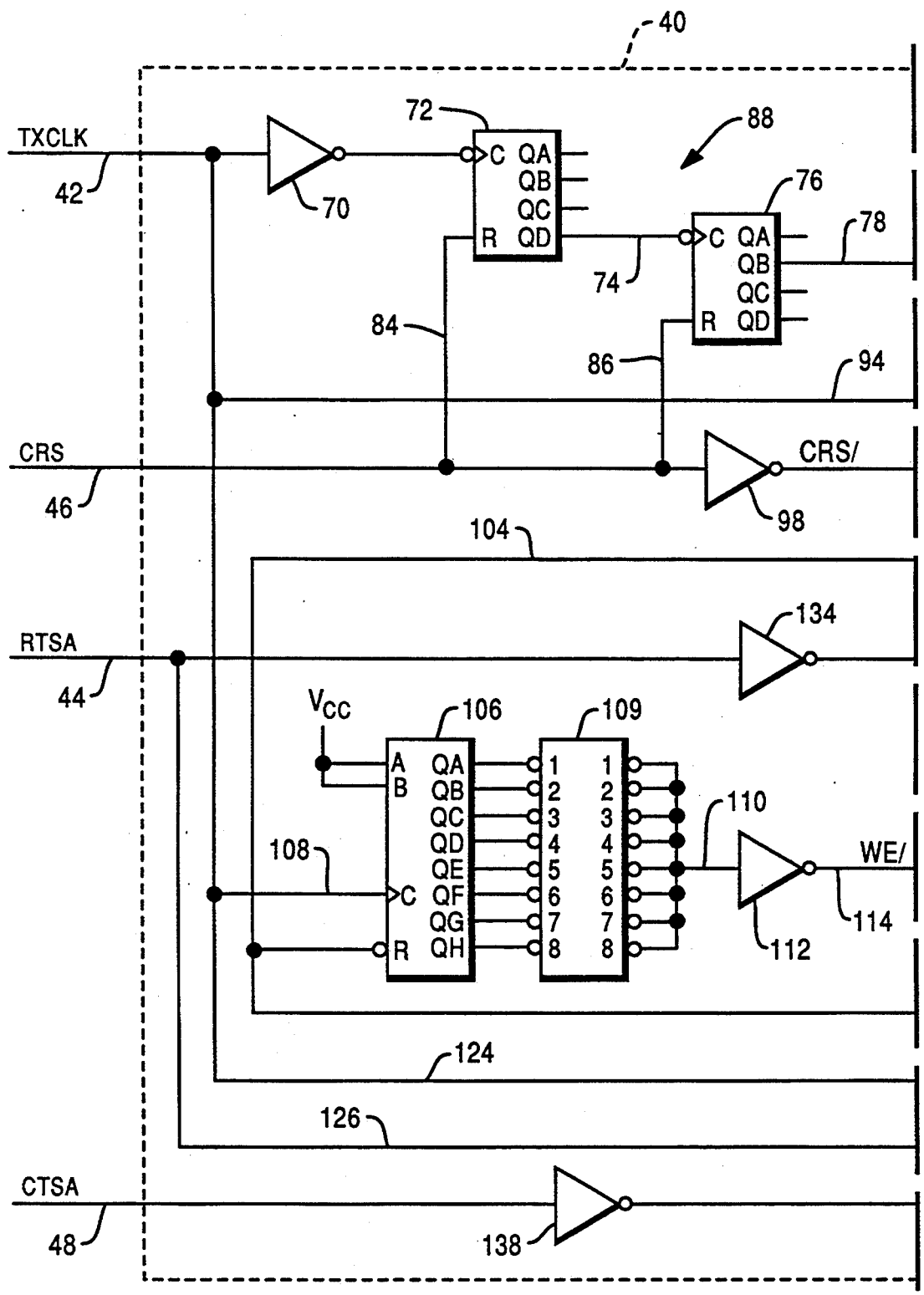
FIGS. 3A and 3B taken together show the signal generator in FIG. 2.
Figure 3B:
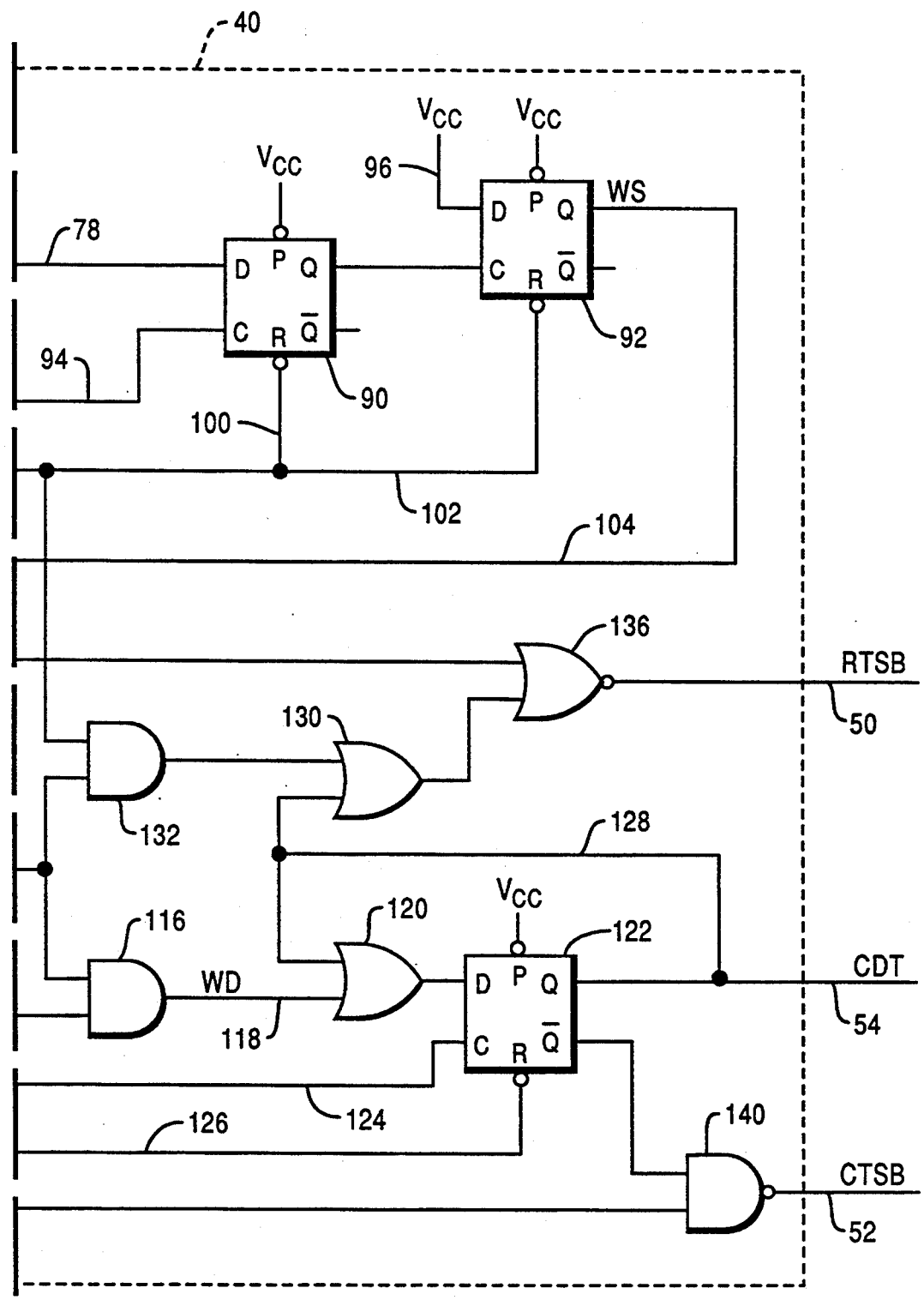

With the above in mind, the signal generator circuit 40 will now be described with reference to FIGS. 3A and 3B. The input line 42, which carries the TXCLK pulses is connected to an inverter 70, the output of which is connected to the count input of 4-bit counter 72 having its QD output connected over a line 74 to a 4-bit counter 76, the QB output of which is connected over a line 78 to the D input of a D-type flip-flop 90. The input line 46, which provides the carrier sense signal CRS, is connected over lines 84 and 86 to reset inputs of the counters 72 and 76, respectively. It should be understood that the devices 70, 72, and 76 together form a timer, indicated generally as 88, such that an active signal appears at the QB output of the counter 76 after a time corresponding to 32 TXCLK periods from the falling edge of the CRS signal.

The Q output of the flip-flop 90 is connected to the clock input of a D-type flip-flop 92. The clock input of the flip-flop 90 is connected over a line 94 to the input line 42. The D input of the flip-flop 92 is connected to a supply voltage $V_{cc}$. The input line 46 is connected to an inverter 98, the output of which is connected to the reset inputs of the flip-flops 90 and 92, over lines 100 and 102, respectively. With this arrangement, the Q output of the flip-flop 92 provides a window start signal WS on an output line 104.

The line 104 is connected to the reset input of an 8-bit shift register 106 (FIG. 3A), the clock input of which receives the TXCLK pulses over a line 108 connected to the input line 42. The outputs of the shift register 106 are connected to respective inputs of a header 109, having its outputs commonly connected to a line 110, whereby a desired one of the shift register outputs may be selected to apply a corresponding delayed signal to the output line 110. The line 110 is connected to an inverter 112 whose output on the line 114 provides an active low window end signal WE/. The WS and WE/ signals on the lines 104 and 114 are applied to an AND gate 116 (FIG. 3B), the output of which provides a window signal WD on a line 118.

The window signal WD on the line 118 is applied to an OR gate 120, the output of which is connected to the D input of a D-type flip-flop 122, the Q output of which is connected to the output line 54 to provide the simulated collision detect signal CDT. The clock input of the flip-flop 122 is connected over a line 124 to receive the TXCLK pulses from the input line 42. The reset input of the flip-flop 122 is connected over a line 126 to the input line 44 which carries the request-to-send signal RTSA.

The Q output of the flip-flop 122 (FIG. 3B) is also connected via a line 128 to an input of the OR gate 120 and to an input of an OR gate 130. Another input of the OR gate 130 is connected to the output of an AND gate 132 which has inputs connected, respectively, to the output of the inverter 98 and to the output of the inverter 112.

The input line 44 (FIG. 3A) is also connected to an inverter 134, the output of which is connected to an input of a NOR gate 136 (FIG. 3B), a second input of which is connected to the output of the OR gate 130. The output of the NOR gate 136 is connected to the output line 50 to provide the request-to-send signal RTSB.

The input line 48 is connected to an inverter 138 (FIG. 3A) the output of which is connected to an input of a NAND gate 140 (FIG. 3B) a second input of which is coupled to the Q/output of the flip-flop 122. The output of the NAND gate 140 is connected to the output line 52 to provide the clear-to-send signal CTSB.

Operation of Signal Generator Circuit 40

The operation of signal generator circuit 40 (FIGS. 3A and 3B) will now be briefly described. When the carrier sense signal CRS on the line 46 drops, the timer 88 provides an active output signal on the line 78 after 32 TXCLK pulse periods, corresponding to the interframe spacing (IFS) time. The output of the timer 88 is synchronized by the flip-flop 90 to eliminate any possible voltage spikes. The CRS/ signal at the output of the inverter 98 ensures that the flip-flops 90 and 92 are enabled when the signal CRS drops. The output of the flip-flop 92 provides the window start signal WS at a time 32 TXCLK pulse periods after the CRS signal drops. When the window start signal WS on the line 104 is inactive, it resets the shift register 106. When the window start signal WS becomes active, it is delayed and inverted by the shift register 106, header 109, and inverter 112, to provide an inverted window end signal WE/ on the line 114. The WS signal on the line 104 and the WE/ signal on the line 114 are combined in the AND gate 116 to provide the window signal WD which is active for a predetermined number N of TXCLK pulse periods, where N lies between 1 and 8, and is selected by selecting a desired one of the outputs QA to QH of the shift register 106 by connecting the corresponding equal numbered pins on the header 109. In the preferred embodiment, the output QD of the shift register 106 is selected, whereby, when the window signal WD has become active, it stays active for 4 TXCLK periods.

If the signal RTSA on the line 44 becomes active during the active state of the window signal WD, the flip-flop 122 provides the signal CDT on the line 54, simulating a collision. The feedback from the flip-flop 122 on the line 128 to the OR gate 120 ensures that when the signal CDT becomes active, it stays active until the falling edge of the signal RTSA (after the controller 22 has transmitted the preamble and jam pattern).

The inverter 138 and NAND gate 140 ensure that the signal CTSB follows the signal CTSA as long as the signal CDT is not active (no simulated collision). When CDT becomes active, then the signal CTSB also becomes active independently of the signal CTSA.

The signal RTSB is produced by utilizing the inverter 134, the AND gate 132, the OR gate 130 and the NOR gate 136. Thus, the signal RTSB does not follow the signal RTSA if the signal CDT is active (simulated collision), thereby preventing transmission of the preamble and jam pattern. Also, since the signal CTSA/ from the inverter 138 is applied to the NAND gate 140 together with the output of the flip-flop 122, the signal CTSB follows the signal CTSA as long as CDT is inactive.

Before describing the operation of station 12, certain characteristics of the wireless LAN will be explained. The operating characteristics of a server 12-1 are often different than those of workstations 12-2 to 12-N. For example, in a network operating system like Novell's Netware v 2.15, a workstation expects one response frame for every request frame it sends to the server. Before a workstation can transmit its next frame, a response frame must be received. Only when the expected response is not received within a set period (frame is assumed lost)(typically 600 msec) will the frame be resent. In contrast, the server which transmits responses frequently has a number of data frames to transmit at a time, all to different workstations. Consequently, the server will generate approximately 50% of all frames in a network.

Operation of a Station

Figure 4A:
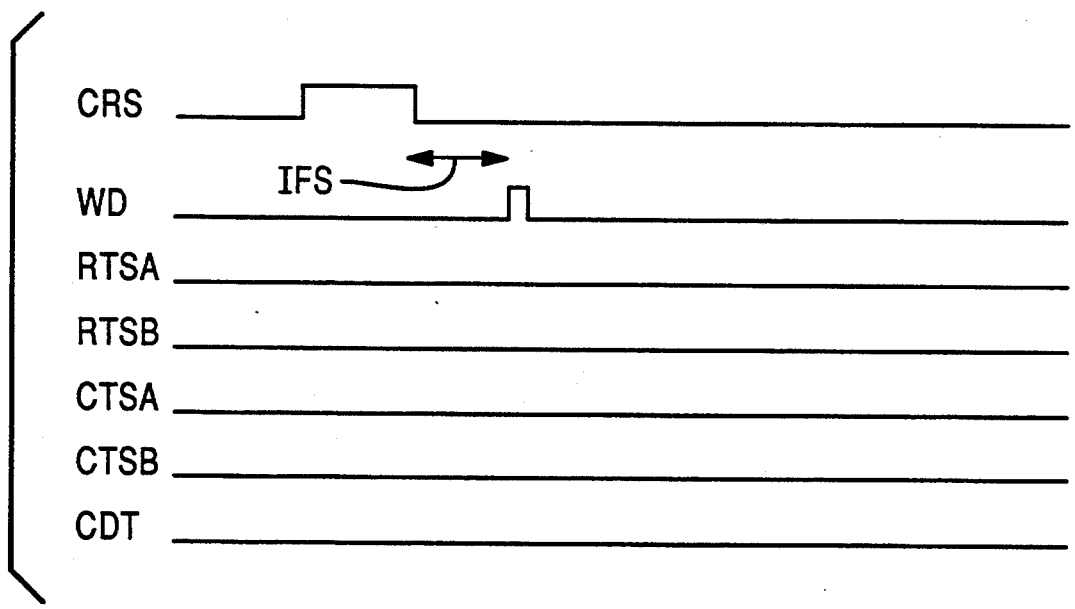
FIGS. 4A to 4C are waveform diagrams helpful in understanding the operation of the LAN station shown in FIG. 2.

The operation of a station 12 will now be explained, with reference to FIGS. 4A to 4C, under three operating conditions. The waveforms in FIG. 4A relate to the situation where another station transmits a data frame, but the station 12 (FIG. 2) does not request transmission of a data frame. Under these conditions, the window signal WD is generated after the 32-bit IFS (interframe spacing) time, but since the station 12 is not requesting to transmit a data frame, the window signal WD has no significant effect.

Figure 4B:
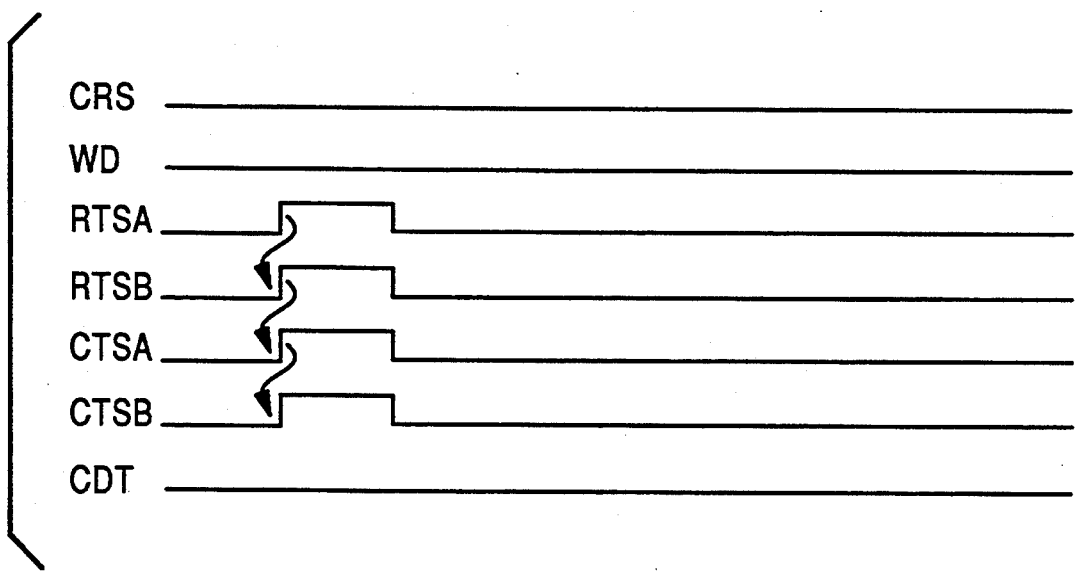

The waveforms in FIG. 4B relate to the situation where the station 12 requests transmission of a data frame, but the other stations are inactive, so that the CRS signal remains at a low level. Under these conditions, the window signal WD is not generated. The request-to-send signal RTSA causes the signal generator circuit 40 to provide the request-to-send signal RTSB to the transceiver 20, which in response provides a clear-to-send signal CTSA to the signal generator circuit 40 which provides the clear-to-send signal CTSB to the LAN controller 22, whereby data frame transmission is enabled.

Figure 4C:
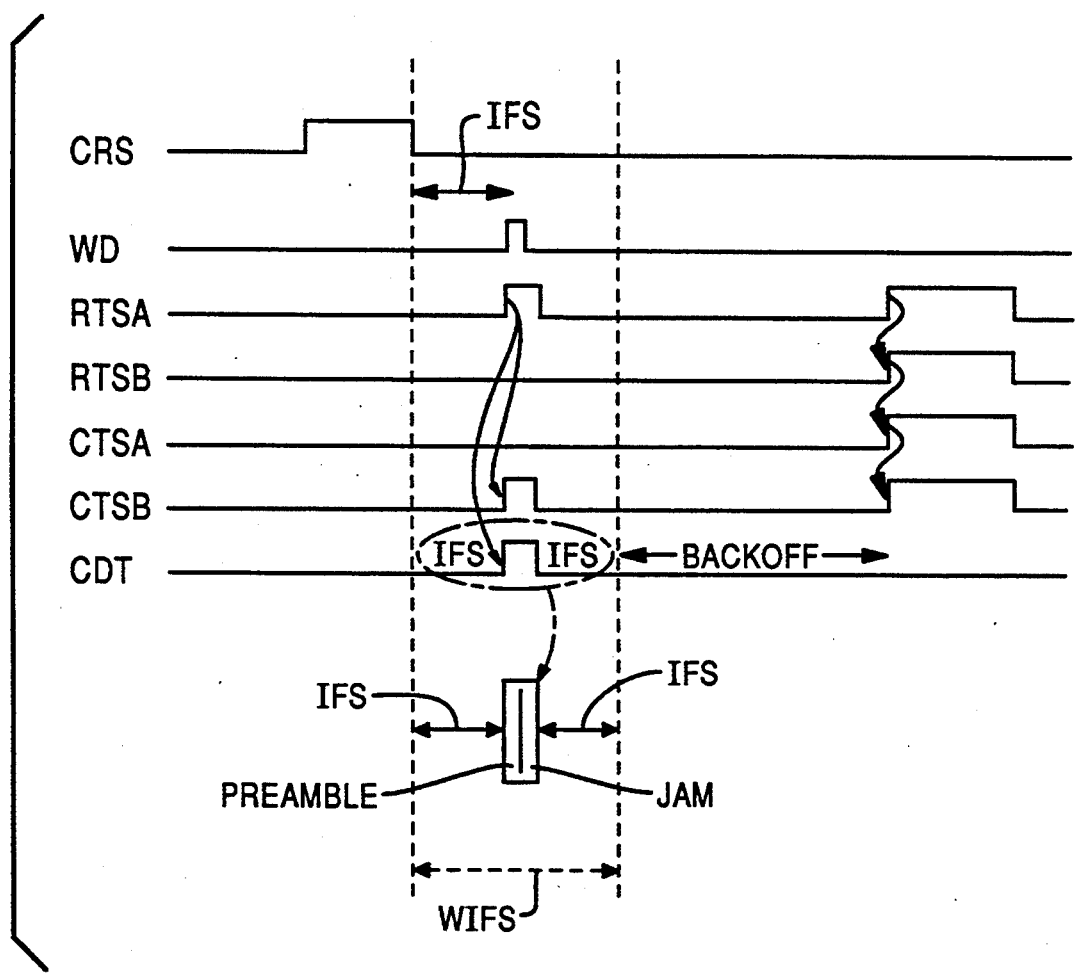

The waveforms shown in FIG. 4C relate to the situation where another station is transmitting a data frame, such that the signal CRS in the station 12 is active at a time when, in the station 12, the LAN controller 22 is notified that the station 12 desires to transmit a data frame. Under these conditions, transmission of the data frame in the station 12 is deferred by the controller 22. After the signal CRS becomes inactive, and following the elapse of the interframe spacing time IFS, the window signal WD is generated in the signal generator circuit 40 in the manner described hereinabove with reference to FIGS. 3A and 3B. Since the controller 22 also activates the signal RTSA at this time, the signal generator circuit 40 activates the signal CDT on the line 54, to simulate a collision. This causes the controller 22 to stop its transmission after completion of sending the preamble and jam patterns. However, these patterns are not transmitted by the station 12 since the signal RTSB is not generated if a collision is simulated. Thus, the controller 22 is conditioned to the backoff mode, calculates its backoff time based on a random number of slot times, as discussed hereinabove, where the random number lies between 0 and $2^{R+K}-1$, K being the preset retry counter offset value. After the random backoff period has expired, the controller 22 attempts to retransmit the deferred frame, as shown at the right-hand side of FIG. 4C.

It will be appreciated that, in accordance with the collision avoidance technique described herein, there is generated, after deferring a frame to be transmitted, a random waiting time before the first new transmission attempt. The total waiting time (called Wireless IFS or WIFS) after the carrier goes inactive is composed of the interframe spacing time, the preamble and jam pattern, a second interframe spacing time, and a random number of slot time intervals between 0 and $2^{K+1}-1$. For an exemplary collision avoidance (CA) operation, the retry counter offset value K can be set to the value 4, making collisions very unlikely. At this retry counter offset value, the probability that two controllers 22 of different stations 12, after deferring frames that arrived during the same period of carrier activity, take the same random number is 1/32.

For the described wireless LAN, there are available the following configurable parameters of the controller 22 different from the default settings: minimum preamble times, lot time, interframe spacing time, and retry counter offset. These configurable parameters have default settings corresponding the IEEE 802.3 Standard with settings for a 10 Mbps network (minimum preamble time of 64-bit-times, slot time of 512 bit-times appropriate in a wired environment with maximum delay; interframe spacing time of 96-bit-times; retry counter offset of 0). For a wireless LAN operating at 2 Mbps and an end-to-end (carrier detect time) delay of 23 microseconds, shorter slot and interframe spacing times can be utilized. In the preferred embodiment, the slot time is fixed at 46 bit-times, the interframe spacing time is 32 bit-times, and the retry counter offset is 4. These settings will result after deferring in a perceptible interframe spacing time of 56 microseconds (corresponding to the duration of two interframe spacing times, the preamble pattern, and the jam pattern of the controller 22), followed by a random waiting time of between 0 and $(2^{10}-1)*23$ microseconds=23.5 milliseconds.

Although the preferred embodiment has been described as a wireless LAN using wireless frequency transmissions, it will be appreciated that in alternative embodiments, other frequencies, outside the 10 KHz to 3000 GHz wireless frequency band, such as infrared frequencies, may be employed in the wireless LAN.

Operation of a Server and Workstation

Figure 5A:
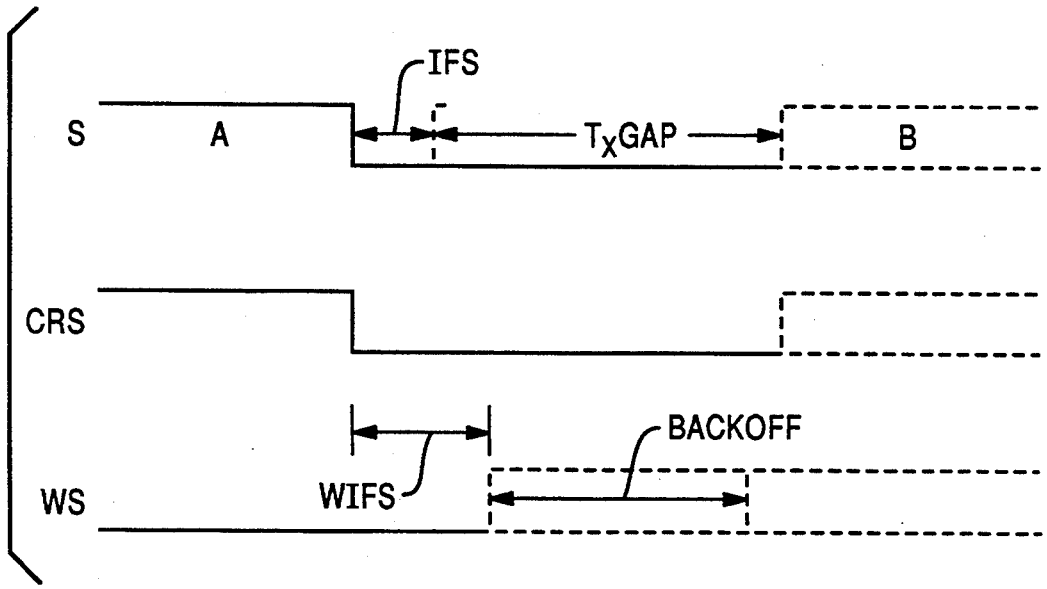
FIGS. 5A and 5B are waveform diagrams helpful in understanding the operation of the present invention.

The operation of server 12-1 and a workstation 12-2 to 12-N will now be explained with reference to FIGS. 5A and 5B. The three lines in FIG. 5A represent the transfer of data frames by the server (S), the signal CRS generated by a workstation in response to the server broadcast data frame, and possible data frames generated by a workstation. As long as the server is transmitting a data frame A, the CRS signal in the workstations is high thereby preventing the workstations from transmitting data. When data frame A is completed, the CRS signal goes low in each workstation and the WIFS (wireless interframe spacing) wait occurs. After the WIFS period, transmissions by the workstation are deferred by a random backoff period, as described previously. A deferring workstation may gain access to the transmission channel when its random backoff period expires. During this time, server S is forced to defer a subsequent transmission of a data frame B. More particularly, server S must wait the standard IFS period. In addition, an additional delay TxGAP period is imposed on server S during which transmission of data frame B is blocked. The combined IFS and TxGAP periods are fixed at a time greater than the IFS and maximum first backoff period of a workstation (first attempt period). This allows a workstation to gain access to the network before a next data frame B is broadcast. If the workstation does not gain access to the transmission channel during the TxGap period, server S is free to transfer data frame B. On the other hand, if the workstation does gain access to the transmission channel, server S must wait to the end of the transmission and then compete with the other workstations for access to the network.

The TxGAP time is predetermined to be slightly longer than the initial random backoff time of the workstations. For k=4, the maximum first backoff would be (R=1) $2^{k+R}=32$ slots. The TxGAP time is programmed into the workstation controller by initiating a predetermined number of NOP (no operation) instructions in the controller.

Figure 5B:
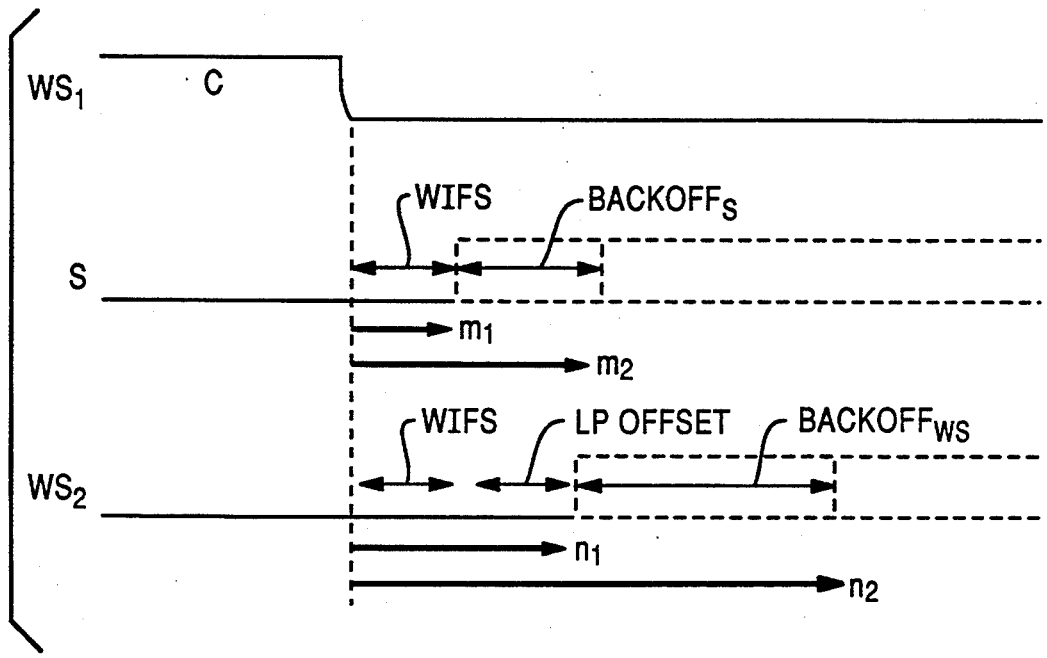

FIG. 5B shows the operation of the server when competing with a workstation to access the transmission channel. The three lines represent a data frame transfer by a first workstation (WS$_1$), a possible data frame transfer by the server (S), and a possible data frame transfer by a second workstation (WS$_2$). Workstation WS$_1$ transfers a data frame C. At the conclusion of the transfer, if server S and workstation WS$_2$ desire access to the transmission channel, each is required to wait for the IFS period before attempting access. Server S and workstation WS$_2$ are then forced into random backoff periods BACKOFFs and BACKOFFws, respectively.

As noted previously, backoff is an integral number of slot times and also an integral number of clock cycles. Backoff is a random number from 0 to a maximum value. The maximum value is $2^R - 1$), where R is the minimum between 10 and the number of retransmission attempts. The intent of the invention is to prevent one station, such as the server, from dominating the network, while in addition reducing the collision probability. By forcing a TxGAP silence period after every transmission, the dominate station problem is prevented. By programming the TxGAP time to a value which is slightly larger than the initial backoff period of a workstation (FIG. 5A), the collision probability of the server frame B and the deferring workstation is minimized.

To compensate for the fact that the server station does not have equal access probability when it has just transmitted a packet A, it can be given a higher probability of accessing the network the next time around. There are a number of ways of achieving this, two of which are shown in FIG. 5B. First, the range of times for BACKOFFs is smaller than the range for BACKOFFws. For example, if BACKOFFs is randomly selected from 8 slot times and BACKOFFws is randomly selected from 32 slot times, there is a greater probability of BACKOFFs expiring first which gives the server access to the transmission channel. Second, the workstation may be provided with an additional fixed delay period (LP OFFSET) which delays the start of the BACKOFFws period. In addition, the backoff periods can overlap, as shown, or can have no overlap which would assure the server of priority access to the transmission channel. Restated, if the number of clock cycles or slot times (measured from the end of data frame C) for server S to gain access to the transmission channel is m and the number of clock cycles or slot times for workstation WS$_2$ to gain access to the transmission channel is n, then statistically m$\frac{1}{2}$n. More particularly, m has a range of values from a minimum of m$_1$ to a maximum of m$_2$. Similarly, n has a range of values from a minimum of n$_1$ to a maximum of n$_2$. If a preferred embodiment m$_2\frac{1}{2}$n$_2$ and m$_1\frac{1}{2}$n$_1$. In a further embodiment where the backoff periods do not overlap, m$_2\frac{1}{2}$n$_1$.

The result will be that access fairness has been restored in a way that the collision probability between workstation frames and server frames is reduced significantly, and will only have a chance to occur when a workstation or a server is pushed into backoff more than once. In practice this will only happen when more than one workstation is deferring to the same message A in FIG. 5A.

The TxGAP can also be programmed in a workstation. However, it will not usually have any effect because typically a workstation does not have another frame to transmit until it has received a response from the server.

It will be clear to those skilled in the art that the present invention is not limited to the specific embodiment disclosed and illustrated herein.

Numerous modifications, variations, and full and partial equivalents can be undertaken without departing from the invention as limited only by the spirit and scope of the appended claims.

What is desired to be secured by Letters Patent of the United States is as follows.

What is claimed is:

1. A wireless local area network, comprising:
a server station; and
a client station which communicates with said server station,
wherein said server station includes (1) means for broadcasting a first frame of information, (2) means for deferring, during a predetermined time period, broadcasting of a second frame of information, said predetermined time period (a) beginning at a point in time immediately after completion of broadcast of the first frame, and (b) being calculated to allow said client station to gain access to the network, and (3) means for broadcasting the second frame, and wherein said client station includes means for deferring broadcasting of a third frame of information by said client station (a) during broadcasting of the first frame by said server station, and (b) during a first random time period which begins at the point in time immediately after completion of broadcast of the first frame.

2. The wireless local area network of claim 1 wherein said predetermined time period is longer than said first random time period.

3. The wireless local area network of claim 2 wherein said first random time period includes a fixed time period and a random number of clock cycles.

4. The wireless local area network of claim 3 wherein said server station includes means for deferring broadcasts by said server station (a) while said client station is broadcasting said third frame, and (b) during a second random time period beginning immediately after the completion of broadcast of said third data frame.

5. The wireless local area network of claim 4 wherein the minimum value for said second random time period is less than the minimum value for said first random time period and the maximum value for said second random time period is less than the maximum value for said first random time period.

6. The wireless local area network of claim 5 wherein said first random time period further includes a second fixed time period and wherein the second random time period includes said first fixed time period and a random number of clock cycles.

7. A wireless local area network, comprising:
a server station which broadcasts data frames;
a first client station which broadcasts data frames; and
a second client station which broadcasts data frames,
wherein said server station includes (1) means for broadcasting a first data frame, (2) means for deferring, during a predetermined time period, broadcasting of a second data frame, said predetermined time period (a) beginning at a point in time immediately after completion of broadcast of the first data frame, and (b) being calculated to allow either said first client station or said second client station to gain access to the network, and (3) means for broadcasting the second data frame,
wherein said first client station includes means for deferring broadcasts of data frames by said first client station (a) during broadcasting of the first data frame by said server station, and (b) during a first random time period which begins at the point in time immediately after completion of broadcast of the first data frame; and
wherein said second client station includes means for deferring broadcasts of data frames by said second client station (a) during broadcasting of the first data frame by said server station, and (b) during a second random time period which begins at the point in time immediately after completion of broadcast of the first data frame.

8. The network of claim 7 wherein:
said server station further includes means for deferring broadcasts of data frames by said server station during a third random time period which begins at a point in time immediately after data frame broadcasts by either said first client station or said second client station; and
the third random time period of said server is statistically of shorter duration than the first random time period of said first client station or the second random time period of said second client station.

9. A method of improving data throughput performance in a wireless network having a first station and a second station, comprising:
transmitting a first data frame from the first station;
delaying transmission of a second data frame from said second station during a first random time period which begins at a point in time immediately after completion of transmission of the first data frame without collision; and
delaying transmission of a third data frame from the first station during a second time period, said second time period (a) being greater than said first random time period, and (b) beginning at the point in time immediately after completion of transmission of the first data frame without collision.

10. The method of claim 9 wherein said first station is a server.

11. The method of claim 9, wherein said first random time period includes a predetermined time period and a random backoff time period.

12. A method of improving data throughput performance in a wireless network having a server workstation and a plurality of Client workstations comprising:
transmitting a first data frame from one of said plurality of client workstations;
delaying any attempt to transmit a second data frame from another workstation of said plurality of client workstations for at least n clock cycles after completion of transmission of the first data frame; and
delaying any attempt to transmit a third data frame from the server for at least m clock cycles after completion of transmission of the first date frame;
wherein n and m are randomly selected and the maximum value of n is greater than the maximum value of m.

13. The method of claim 12 wherein the minimum value of n is greater than the minimum value of m.

14. The method of claim 13 wherein the minimum value of n is greater than the maximum value of m.

15. The method of claim 13 further comprising:
transmitting the third data frame from said server;
delaying each further attempt to transmit data frames from any of the plurality of workstations during a third random time period which begins immediately after completion of transmission of the third data frame without collision; and
delaying each further attempt to transmit data frames from said server during a fourth time period, said fourth time period (a) being greater than said third random time period, and (b) beginning immediately after completion of transmission of the third data frame without collision.

* * * * *